R. B. PRICE.
TIRE.
APPLICATION FILED APR. 24, 1915.
1,209,645. Patented Dec. 19, 1916.
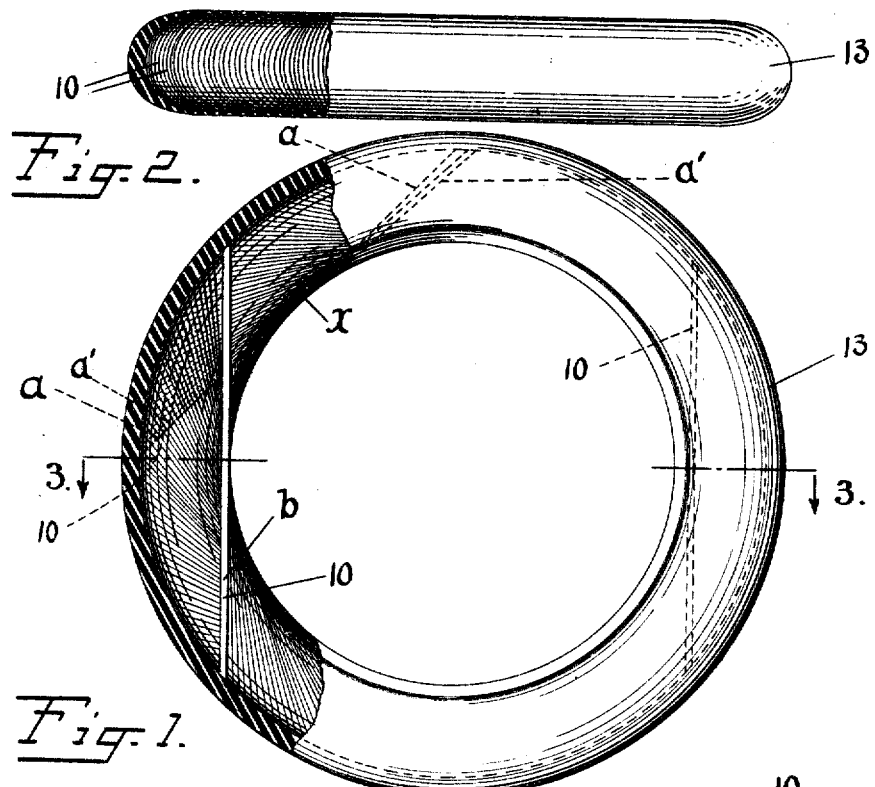
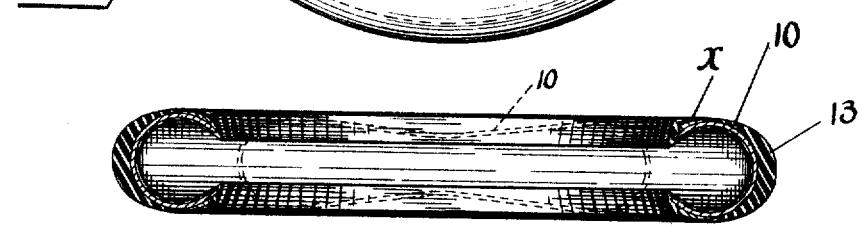
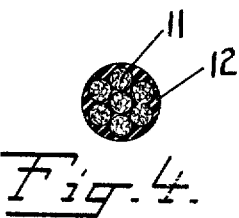
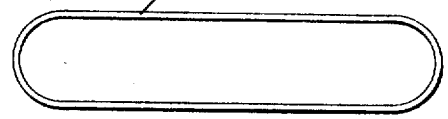
WITNESS:
S. G. Taylor
INVENTOR
Raymond B. Price
BY
Ernest Hopkinson
HIS ATTORNEY

UNITED STATES PATENT OFFICE.

RAYMOND B. PRICE, OF NEW YORK, N. Y., ASSIGNOR TO RUBBER REGENERATING COMPANY, A CORPORATION OF INDIANA.

TIRE.

1,209,645.

Specification of Letters Patent.

Patented Dec. 19, 1916.

Application filed April 24, 1915. Serial No. 23,573.

*To all whom it may concern:*

Be it known that I, RAYMOND B. PRICE, a citizen of the United States, and a resident of New York, in the county of New York and State of New York, have invented certain new and useful Improvements in Tires, of which the following is a full, clear, and exact description.

This invention relates to tires and has for an object to provide a tire composed of a plurality of individual closed loops.

In constructing tires, it is customary to build up the same of material embodying an aggregation of rubber treated threads commonly called a tire fabric. It is obvious that during the tire building operation, which consists of pressing and distorting this fabric to conform to a ring core, some of the threads are stretched more than others, and even the intervening rubber is thinned out harmfully. During subsequent vulcanization the tire becomes set and fixed in this unbalanced condition, that is, there will exist in the fabric different degrees of tension, different thicknesses of intervening rubber, etc., at different parts thereof. To obviate the above disadvantages I construct the tire of closed loop or endless elements, these elements being separately applied preferably tangentially to the inner or bead portions of the ring core, and all of the elements being similarly laid under identical condition, whereby a predetermined uniformity of tension, etc., will exist throughout the product.

The invention can be readily understood by reference to the accompanying drawing in which—

Figure 1 is a side elevation of a tire embodying my improvements, partially broken away to expose the elements; Fig. 2 is a plan view of the tire partially broken away to expose the elements; Fig. 3 is a cross-section on the line 3—3, Fig. 1; Fig. 4 is an enlarged cross-sectional view through one of the elements; Fig. 5 is a plan view of one of the elements.

I will now describe one embodiment of my invention to obtain a tire embodying a plurality of independent closed loop elements, intersecting each other, it being understood that all methods of obtaining an article embodying this construction will fall within the scope of my invention as set up in the appended claims.

Referring now to the drawing, 10 designates an element preferably of fibrous material, and of endless or closed loop construction, and I employ a plurality of elements of this type, each preferably rubber treated or coated. However, it is not essential that the elements be initially treated with rubber, as they may be so treated after application to the ring core, if desired. In constructing each element, I preferably produce a predetermined tension by stretching the element upon the form upon which it is built, but this tension may be produced during application of the preformed element to the tire, if desired, or all tension may be dispensed with and the element be laid taut in the tire. In the event of the tension being produced in the element before application to the tire, I may permanently fix the tension by partially curing the rubber of the element, in case the element has been previously coated with rubber. During partial curing the rubber takes such consistency as to itself resist displacement under distorting pressure to which the tire may be exposed either during the building operation or during vulcanization and at the same time prevent return of the fiber of the element to normal condition or that condition existing in the element before the tension is intentionally produced therein. In building the tire, I apply these preformed elements 10 to a ring core (not shown) of the usual and well known kind in such a manner that they extend preferably tangentially to the bead forming portions of the ring core and in the finished product consequently exist in tangential relation to the inner edges or bead portions of the tire. In Fig. 1 is shown an incomplete ply of these elements, the ply beginning with the element at the point marked *a*, and ending with the element at the point marked *b*, the elements being laid toward the right contiguous with each other around the ring core. For example, the first element may be laid at *a* to extend tangentially to the bead of the ring core, and then the next element will be laid in like manner upon the ring core contiguous with the element *a*, as shown at *a'*, that is, its leading end lies upon and in advance of the leading end of the first laid element, it then intersects or passes across the latter at the point marked *x*, and its rear end passes in rear of the rear end of the first laid element as shown. The elements are laid preferably individually, or one at a time in this manner until a single ply has been formed on the ring core whereupon a new ply may be begun. It is obvious that each ply will consist of two thicknesses of elements. To complete the tire a rubber tread layer 13 may be applied if desired and the whole then vulcanized and given final formation by any usual or desired cure.

I do not limit myself to any particular cross-section of elements, as the elements may be variable in cross-section, that is, rectangular, square, oval, or any desired shape.

I do not limit myself to the precise construction of a tire embodying a closed loop carcass portion and a tread applied thereon, as I may incorporate a breaker strip with this construction, if desired.

In Fig. 4 I have shown a particular construction of element, the same including a plurality of fibers 11 embedded in a coating 12 of rubber. However, I do not intend to limit myself to this particular construction as I may employ but a single fiber with its surrounding coat to constitute the element, or may even employ a plurality of such elements as shown in Fig. 4, twisted, woven, or otherwise built together to produce a unitary structure. In fact I do not limit myself to any particular construction of element, it only being essential to the practice of the invention that closed loops of material be individually built into the tire.

When in this specification and in the appended claims I use the word "element" I intend the same to cover a fiber, thread, strand, cord, cable, band, braid, tape, fabric, or aggregation of any of the above laid on the tire as an integral independent unit.

When I speak of rubber treated or coated elements I mean the term to include not only rubber, but also balata, gutta percha, and the like, which although not commonly vulcanized, are in fact capable of vulcanization or setting. And although I use the term "tangentially" in this specification I do not wish to limit myself to this particular angular inclination of the elements, as I may arrange the same otherwise than tangentially without departing from the spirit or sacrificing any of the advantages of the invention.

What is claimed is:

1. A tire embodying a plurality of independent, closed loop elements, the ends of each element passing across the tread of the tire and the sides passing along the opposite sides of the tire and extending substantially tangential to the inner edges of the tire.

2. In a tire, a double ply formed of separate, contiguous closed loop elements, the ends of each element passing across the tread of the tire and the sides passing along the opposite sides of the tire and extending substantially tangential to the inner edges of the tire.

3. A tire embodying a plurality of separate, closed loop elements extending substantially tangential to the inner edges of the tire and crossing each other near their points of tangency.

4. A tire embodying uniformly tensioned closed loop elements, the ends of each element passing across the tread of the tire and the sides passing along the opposite sides of the tire and extending substantially tangential to the inner edges of the tire.

5. A tire embodying similar closed loop elements of material arranged contiguously and crossing each other upon the sides of the tire, the ends of each element passing across the tread of the tire and the sides passing along the opposite sides of the tire and extending substantially tangential to the inner edges of the tire.

6. A tire embodying separate preformed loops of uniformly tensioned rubber coated fibrous material, the ends of each element passing across the tread of the tire and the sides passing along the opposite sides of the tire and extending substantially tangential to the inner edges of the tire.

Signed at New York, N. Y., April 22d, 1915.

RAYMOND B. PRICE.